United States Patent [19]

Johnson

[11] Patent Number: 4,529,085
[45] Date of Patent: Jul. 16, 1985

[54] SELF-CLEANING AND ANTI-BRIDGING GRAIN RECEIVING AND TRANSPORTING DEVICE

[75] Inventor: Harlan F. Johnson, Litchfield, Minn.

[73] Assignee: H. F. Johnson, Inc., Litchfield, Minn.

[21] Appl. No.: 507,099

[22] Filed: Jun. 23, 1983

[51] Int. Cl.³ .............................................. B65G 47/19
[52] U.S. Cl. .................................... 198/532; 222/556; 414/573
[58] Field of Search ............... 414/519, 520, 326, 573; 222/508, 196, 198, 556, 564, 510; 198/530, 532, 548, 550, 558, 616, 671

[56] References Cited

U.S. PATENT DOCUMENTS

| | | | |
|---|---|---|---|
| 1,921,959 | 8/1933 | Warren | 414/520 |
| 2,412,121 | 12/1946 | Bradshaw | 414/520 |
| 2,507,873 | 5/1950 | Ward | 198/532 X |
| 3,459,409 | 8/1969 | Goldberger | 198/616 X |
| 3,556,469 | 1/1971 | Barger | 222/510 X |
| 4,095,705 | 6/1978 | Hood | 414/519 |

FOREIGN PATENT DOCUMENTS 452976  1/1978  U.S.S.R. .............................. 414/326

*Primary Examiner*—Joseph E. Valenza
*Assistant Examiner*—Jonathan D. Holmes

*Attorney, Agent, or Firm*—Robert W. Doyle; Sten Erik Hakanson

[57] ABSTRACT

A grain handling device for the receiving and transporting of grain and the like with the primary aspects of this invention being related to ground level receiving of such grain from a carrier, such as a truck, holding and controlling such grain and transporting such grain to a storage bin, typically at an elevation higher than that of the grain delivery carrier. The primary aspects of this invention are the positive control of the grain received from the truck into the grain receiving bin through the use of a valve disposed in the grain bin at the outlet thereof for control of the rate of flow of the grain from the grain holding bin into a grain transport. The valve is configured in a unique way to cooperate with sloping bin walls and the bin outlet to substantially seal such outlet in the valve closed position and to prevent bridging of grain within the grain receiving bin, thereby eliminating plugging at the grain bin outlet. In addition, the valve has a grain confronting prow which allows easy manual opening of the valve at such time as the grain receiving bin is completely filled with grain, covering the valve. Of particular importance is the location of the valve within the grain receiving bin whereby the grain is completely emptied from the grain receiving bin, thereby eliminating the need to clean the bin between uses or between handling of different types of grain.

3 Claims, 5 Drawing Figures

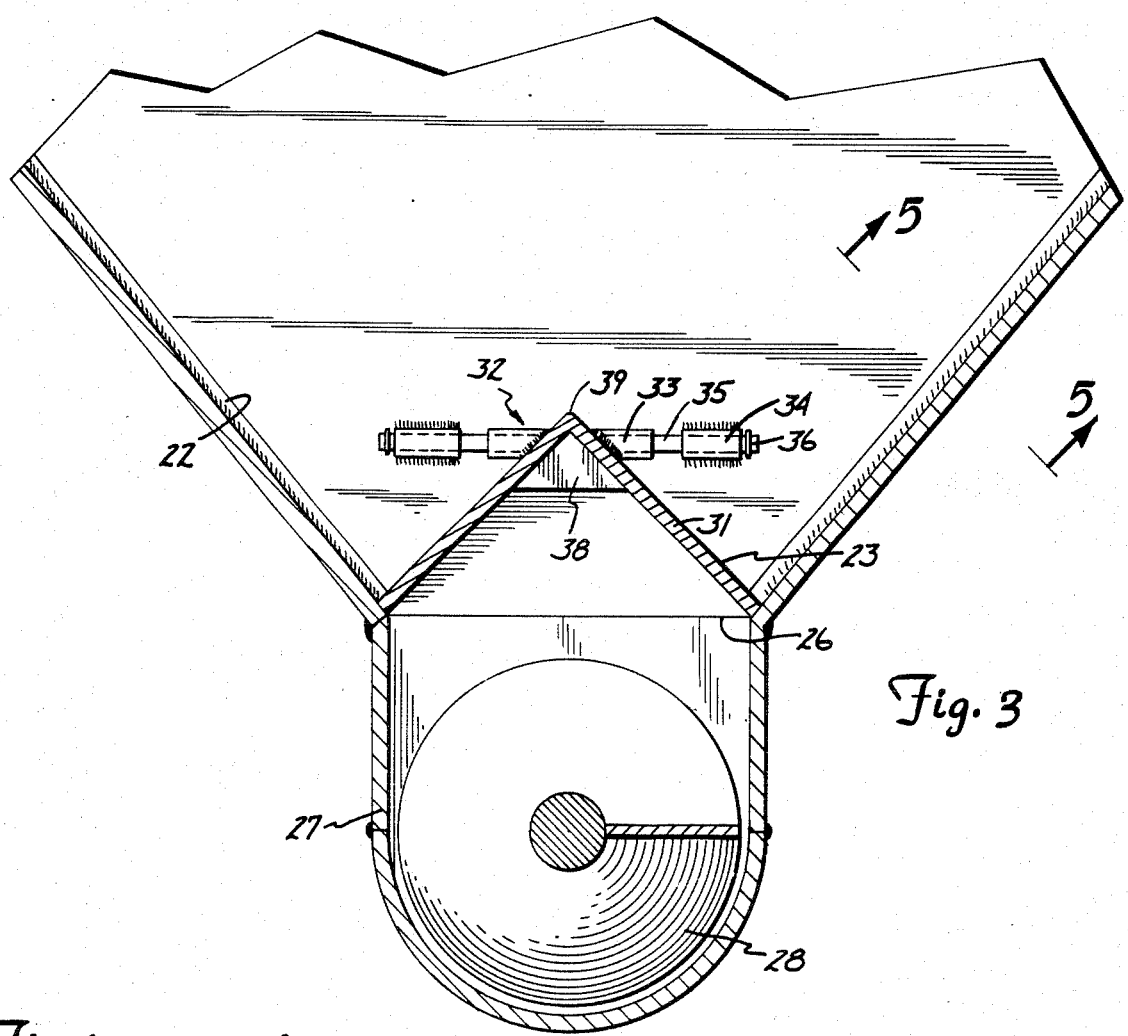

SELF-CLEANING AND ANTI-BRIDGING GRAIN RECEIVING AND TRANSPORTING DEVICE

FIELD OF THE INVENTION

This invention relates generally to grain handling devices, and more particularly to self-cleaning and anti-bridging grain receiving and transporting devices, wherein the bin may be completely emptied between uses, and control of grain within the bin is manually achieved through the use of a valve means with a grain confronting prow which moves easily through the grain, thereby uncovering the grain discharge opening and which valve means prevents bridging of the grain.

BRIEF DESCRIPTION OF THE INVENTION

A self-cleaning and anti-bridging grain receiving and transporting device, including a grain holding bin, having sloping sides converging inwardly to a bin outlet and a valve means disposed in the bin and cooperating with the bin outlet, whereby the grain flow rate through the outlet may be controlled. The valve means is structured to prevent bridging of grain over the bin outlet. A grain transport means is provided and communicates with the grain bin opening in such a way as to receive grain and transport the grain to a storage bin for permanent storage. The transport means further includes a drive mechanism. The device is designed in such a way that cleaning of the grain holding bin between operations is not necessary. This eliminates spoilage of grain which would result if the bin was not completely emptied between operations. The valve means includes a grain confronting prow which, when confronting the grain, moves easily through the grain into an open position facilitating the operator's manual opening of the valve means to allow grain to pass through the bin opening. Further, the valve means is so configured as to prevent bridging or plugging of the grain within and over the grain bin outlet.

BACKGROUND AND OBJECTS OF THE INVENTION

The applicant is well skilled in the knowledge of grain receiving and transporting devices. With his knowledge of the art, it is the applicant's considered opinion that the art does not include the combination of a self-cleaning bin construction with an anti-bridging valve which prevents bridging from occurring at such time as grain is received and held in the bin. Further, the art does not provide a unit which allows for easy opening of the grain bin for communication with a grain transporting device.

In the agricultural industry, harvesting of grain is done periodically throughout the growing season. Harvest of one grain may begin earlier than harvest of a second grain. In addition, very often the farmer will use part-time, semi-skilled help during the periodic labor-intensive process of harvesting. Accordingly, such semi-skilled help may have difficulty in backing a grain delivery truck over an opening which must receive grain and elevate grain to a storage bin. Accordingly, the grain receiving device is level with the ground to allow ease in manipulation of the grain truck over the receiving bin.

The grain receiving bin must be thoroughly cleaned between usage or grain will spoil within the below ground grain receiving bin and mix with subsequent deliveries of grain as the grain proceeds through the grain receiving bin transporting mechanism and into storage bins. Further, between delivery of grains, the holding bin must be cleaned out so that different types of grain are not mixed. Because of the shape and size of the grain holding bin, it is very difficult to clean and this invention serves to obviate the need for cleaning the bin. Further, grain stored in the holding bin, even for a short time, will oftentimes bridge or plug through the natural arching of the granular material over the holding bin outlet and the purpose of this invention is to prevent the bridging while allowing easy opening of the grain bin outlet.

In accordance with the background of the invention, it is, therefore, an object of the applicant's invention to provide a grain receiving and transporting device which is self-cleaning.

In accordance with the background of the invention, it is, therefore, an object of the applicant's invention to provide a grain receiving and transporting device which is anti-bridging.

It is a further object of the applicant's invention to provide a grain receiving and transporting device with a means for controlling the flow rate of the grain from the grain holding bin.

It is a further object of the applicant's invention to provide a grain receiving and transporting device which facilitates receiving grain from a grain truck driven by a semi-skilled operator.

These and other advantages of the applicant's application will more fully appear upon consideration of the accompanying description which incorporates the included drawings.

DESCRIPTION OF THE DRAWINGS

FIG. 3 is an enlarged sectional view taken generally along line 3—3 of FIG. 2 illustrating the valve means in closed position;

FIG. 4 is a perspective view of the valve means of the present invention;

FIG. 5 is a greatly enlarged sectional view taken generally along a line of 5—5 of FIG. 3 showing details of applicant's anti-bridging bin support member.

DESCRIPTION OF A PREFERRED FORM OF THE INVENTION

Figure 1:
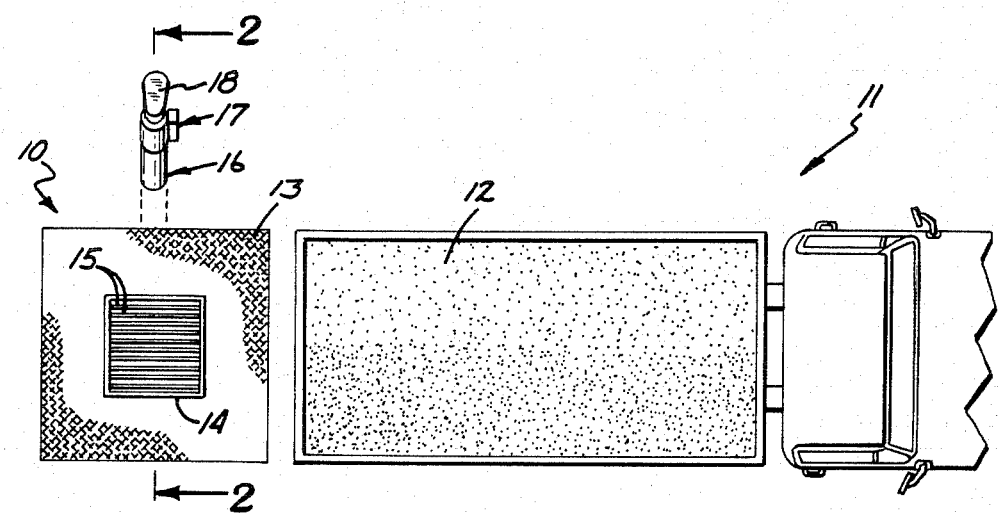
FIG. 1 is a plan view of the grain receiving and transporting device embodying the concept of the applicant's invention, and illustrating a grain containing truck aligned with a grain receiving and transporting device.

In accordance with the accompanying drawings, the self-cleaning and anti-bridging grain receiving and transporting device embodying the concepts of the applicant's invention is shown in FIG. 1 and is generally designated 10. Truck 11 containing grain 12 is shown aligned with the grain receiving and transporting device 10, positioned adjacent to truck receiving platform 13.

Figure 2:
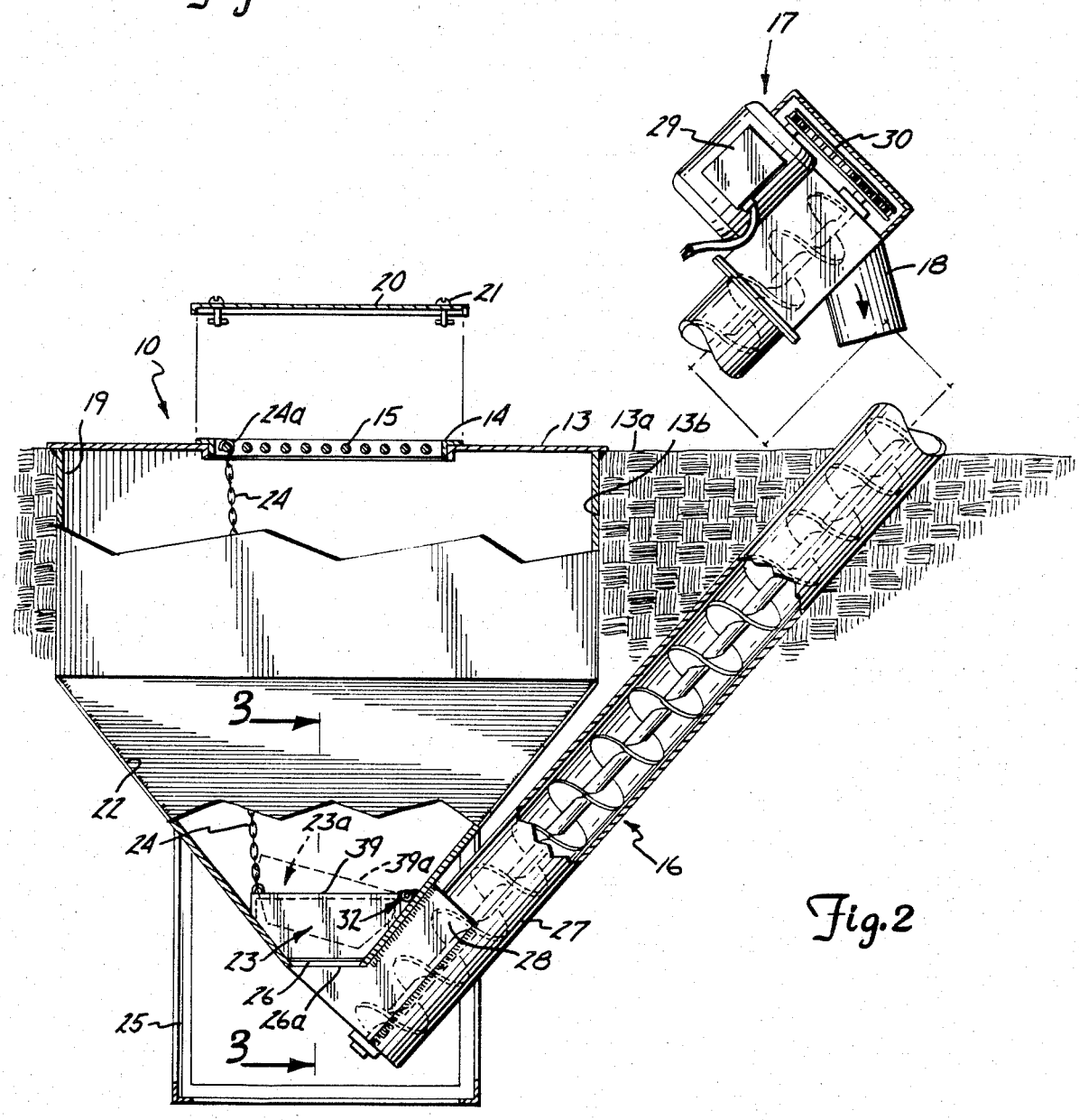
FIG. 2 is an enlarged sectional view taken generally along line 2—2 of FIG. 1 with portions broken away to show the operation of the valve means.

Referring to FIG. 2, it can be seen that the self-cleaning and anti-bridging grain receiving and transporting device is at ground level 13a, being positioned within pit 13b. Grain receiving opening 14 receives grain 12 from truck 11 through grate 15 which screens out undesirable foreign material, such as rocks, sticks and the like. As illustrated in FIG. 2, grain transport means 16 elevates the grain, in this instance, driven by grain transport drive means 17, for discharge of the grain through grain discharge 18.

Grain holding bin 19 includes a grain bin cover 20 with fastening means 21. In this manner, grain bin 19 may be covered when not in use, thereby preventing rain and other deleterious matter from entering the grain bin. Further, grain bin cover 20 provides a safety feature since the grain holding bin 19 is submerged in pit 13b positioning grain receiving opening at ground level.

Grain holding bin 19, as can be seen from FIG. 2, includes a first and second pair of opposed bin sloping sides 22 converging inwardly and downwardly. Valve means 23 is affixed to one of said sloping bin sides 22 in closed position and, as can be seen from FIG. 2, may be located in several positions, with an alternate position of the valve means 23a shown with dotted lines. A manual valve operating means 24 is affixed to valve means 23 and includes hook 24a which may be secured to grate 15 at the desired opening of valve means 23. Of course, it is obvious that mechanical means such as a pulley arrangement may also be used in place of the manual valve operating means 24 and hook 24a.

The grain holding bin 19 is supported within pit 13b through the use of grain bin support structure 25. The bin sloping sides 22 converge at grain bin outlet 26 providing a pair of opposed first and second grain bin outlet surfaces 26a which cooperate with valve means 23 to substantially close the grain bin outlet.

Grain transport housing 27 is in communication with grain bin outlet 26 in such a way that grain may flow from grain holding bin 19 through grain bin outlet 26 into housing 27. Within housing 27 is, for example, grain conveying auger 28 which rotates in a well known manner conveying grain upwardly. Electric motor 29 is shown connected to drive chain 30 which, in turn, is connected to auger 28, thereby causing the grain conveying auger 28 to rotate, carrying the grain through housing 27 into grain discharge spout 18.

Referring now to FIG. 3 and FIG. 4, detail of valve means 23 and the manner in which said valve means 23 cooperates with bin sloping sides 22 and bin outlet surfaces 26a may be seen. First and second pairs of opposed bin confronting surfaces 31 confront sloping sides 22 in the closed position of valve means 23, whereby contact is made between bin sloping sides 22 and valve means surfaces 31.

Valve hinge means 32 is affixed to valve means 23 and one of said bin sloping sides 22, whereby valve means 23 may be rotated between open and closed positions. Said valve hinge means comprises valve axle housing 33 affixed to valve means 23 and axle housing 34 affixed to bin sloping sides 22. Axle 35 is inserted through axle housing 33 and axle housing 34 and the axle is secured therein by axle retainer 36, thereby forming a hinge allowing the valve means to rotate about axle 35.

At such times as valve means 23 is in the closed position, valve means surfaces 31 are engaged with bin sides 22 and a pair of opposed bin outlet confronting surfaces 37 are engaged with bin surfaces 26a, thereby, in combination sealing bin outlet 26.

Referring now to FIG. 2, manual valve operating means 23 may be lifted so that grain confronting prow 39 moves readily through grain stored in bin 19 to a grain confronting prow position 39a as shown by dotted lines.

The phenomenon of bridging is well known in the art and may be described briefly as the forming of a natural arch of granular material over the opening through which the granular material discharges. The arch has sufficient strength to hold back granular material from flowing through the opening. Valve means 23 is constructed in such a manner that a pair of opposed antibridging sloping sides 40 are included and project through the location of the natural arching of the granular material, thereby preventing bridging from grain confronting prow 39. Such sides slope downwardly and outwardly. FIG. 5 shows round internal bridge supports 41 positioned on bin sloping sides 22, thereby further preventing the occurrence of bridging.

In operation, truck 11 backs over grain receiving opening 14 and discharges grain into grain holding bin 19. During discharge, valve means 23 is in the closed position. At an appropriate time, grain transport drive means 17 is engaged whereby grain may be elevated to a storage bin. Valve means 23 is opened manually by lifting manual valve operating means 24 and securing hook 24a to grate 15 at the desired valve opening or rate of flow of grain from holding bin 19 through grain outlet 26. Since the grain transport means 16 is located outside of holding bin 19, and since valve means 23 allows for complete emptying of bin 19, there is no need to clean bin 19 between uses.

Valve means 23 includes grain confronting prow 39 so that the valve means may be easily opened against bin 19 fully loaded with grain since grain confronting prow 39 moves easily through the grain. In operation, grain cannot bridge over bin outlet 26 since valve means anti-bridging sloping surfaces 40 interrupt the arch which would otherwise be formed contiguously, thereby plugging grain bin outlet 26 with arched grain capable of holding back all grain above such naturally formed arch. In the closed position, valve means 23 bin side confronting surfaces 31 and bin outlet confronting surfaces 37 combine and operate with bin sidewalls 22 and grain bin outlet surfaces 26a to form a continuous seal, substantially preventing flow of grain through grain bin outlet 26 until such time as valve 23 is opened.

It should be obvious that the applicant has provided a unique self-cleaning and anti-bridging grain receiving and transporting device for use with granular material, which ensures self-cleaning and anti-bridging within a grain bin receiving device and which provides self-cleaning and easy opening such that flow of material may be readily controlled.

What I claim is:

1. A self-cleaning and anti-bridging grain receiving device for receiving grain and the like from a carrier for holding and controlling said grain and transporting said grain for discharge into a storage bin, which grain receiving and transporting device comprises:
    a. a grain holding bin, said grain holding bin having a grain receiving opening and a first and second pair of opposed bin sloping sides converging inwardly and downwardly to a grain bin outlet;
    b. a pair of opposed valve confronting surfaces, positioned on said first pair of bin sloping sides at said grain bin outlet;
    c. a pivotally operated prow valve, pivotally affixed in said holding bin on one of said second pair of opposed bin sloping sides, said valve means interposed between said grain receiving opening and said grain bin outlet, said valve including a grain confronting prow, said prow formed by a pair of opposed downwardly and outwardly projecting grain confronting sides, so that said valve prevents a grain bridge from forming after said valve is opened and the grain begins to flow through said bin outlet, and so that said valve can be easily opened when said bin is full of grain, and where said valve may be moved from a closed position to an open position, said valve including a pair of opposed bin outlet confronting surfaces for contacting with said opposed valve confronting surfaces when the valve is in the closed position, and said valve including a first and second pair of opposed bin sloping side confronting surfaces for contacting with said second pair of opposed bin sloping sides when the valve is in the closed position, so that said grain bin outlet is substantially sealed when said valve is in the closed position, and so that said valve by forming a seal between said first and second pair of opposed bin sloping sides allows all of the grain to flow past said valve and through said bin outlet when said valve is opened thereby allowing complete emptying of said bin;

d. valve opening means, affixed to said valve whereby said valve may be moved from the closed position to the open position, allowing grain to flow through said grain bin outlet, and said valve opening means including means for securing said valve in a predetermined open position so that the flow of the grain through said bin outlet can be regulated; and e. grain transporting means, positioned in communication with said grain bin outlet to provide transport of said grain to a storage bin, including drive means connected to said grain transporting means.

2. The structure set forth in claim 1 wherein said grain holding bin includes cover means for said grain receiving opening.

3. The structure set forth in claim 1 wherein said grain transporting means includes an auger conveyor to elevate grain above said grain bin outlet.

* * * * *